Feb. 7, 1933.  C. L. KNUTSON  1,896,630
SNAP FASTENER STUD
Filed Dec. 30, 1931
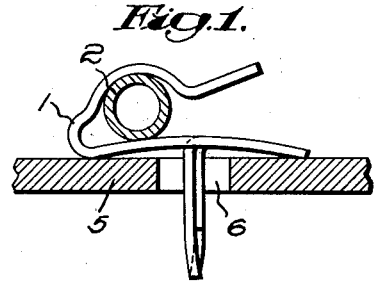
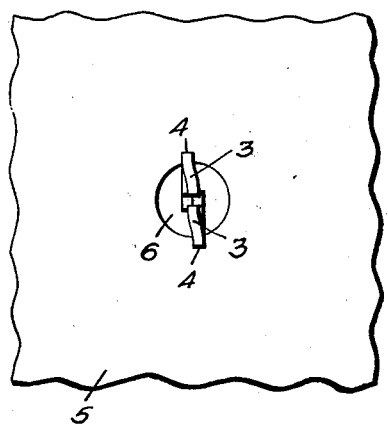
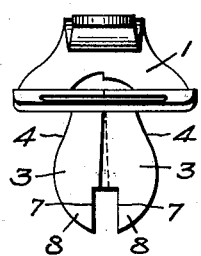
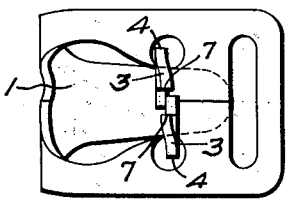
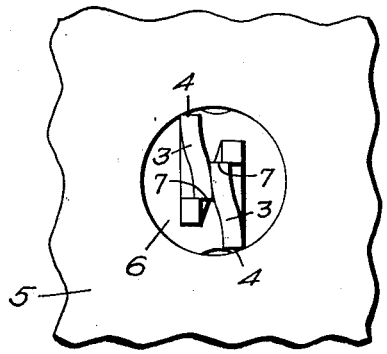
Inventor:
Carl L. Knutson
by Emery, Booth, Varney & Townsend
Attys Patented Feb. 7, 1933

1,896,630

UNITED STATES PATENT OFFICE

CARL L. KNUTSON, OF MAYWOOD, ILLINOIS, ASSIGNOR TO UNITED-CARR FASTENER CORPORATION, OF CAMBRIDGE, MASSACHUSETTS, A CORPORATION OF MASSACHUSETTS

SNAP FASTENER STUD

Application filed December 30, 1931. Serial No. 583,801.

My invention aims to provide improvements in snap fasterner studs adapted to be locked to the parts to which they are attached.

In the drawing which illustrates a preferred embodiment of my invention:—

Figure 1 is an enlarged section through an installation showing one form of fastener to which the locking means of my invention may be applied;

Fig. 2 is an elevation view of a portion of the structure to which the fastener is applied showing the aperture therein and the shank of the stud locked in the aperture;

Fig. 3 is an end view of the fastener shown in Figure 1;

Fig. 4 is an under side plan view of the fastener shown in Fig. 3; and

Fig. 5 is an enlarged view of the structure shown in Fig. 2, but showing the shank of the fastener as it appears during the operation of attaching the fastener to the supporting structure.

My invention relates particularly to the idea of providing simple locking means as an integral part of the fastener whereby fasteners may be constructed for use with structures of various thicknesses and which will lock the fastener in place against accidental removal.

While I have illustrated and will describe a specific type of fastener to which my invention is applicable, it should be understood that the invention is equally useful with any type of fastener having two yieldable arms adapted to make snap fastening engagement with a socket or other suitable structure. Fasteners of that general type are well known to me and are now quite well known in the art. With this type of fastener in mind, my invention aims particularly to provide a simple and efficient locking means whereby the arms are locked in engagement with the socket or other suitable structure especially against axial disengagement. The locking means is so constructed that the fastener may be easily and quickly engaged with the socket or other structure by an action which during the attaching operation moves the arms apart in a transverse direction, as clearly illustrated in Fig. 5.

Referring now to the specific form of fastener illustrated, I have shown one which is made from a single piece of sheet metal bent to provide a head or base 1 which is more or less hook-shaped, it being provided with a pair of yieldable portions connected at one end and open at the other end to permit insertion of a conduit 2 which may be a pipe, wire, or the like. The fastener is so constructed that a pair of yieldable fingers or arms 3—3 are formed from the blank and extend from one of the portions of the base 1. These fingers 3—3 comprise a stud shank and are arranged, preferably, in such a manner that one is offset relative to the other so that they may move toward and away from each other edgewise in a scissors-like action. The outer edges 4—4 are shaped to converge relative to each other from the base 1 and then diverge toward each other at their free ends, thereby providing means for guiding and holding the shank in engagement with a structure such as the part 5 shown in Figs. 1 and 2. The arms 3—3 pass through the aperture 6 in the part 5 and engage the wall surrounding the aperture as illustrated. Since the edges 4—4 diverge for a substantial distance (Fig. 3), the shank is adapted to engage parts of different thicknesses. Thus within certain limits the fastener will always hold the base tightly against the part to which the fastener is to be attached.

The fastener thus far described is not new and it has been found that stresses and strains exerted upon that type of fastener by the conduit or other part tend to pull the fastener loose. In order to remedy this trouble, I have provided the fastener with locking means which I shall now describe.

The particular locking means illustrated comprises an abutment 7 formed on each of the arms 3—3 adjacent to the outer end. When the arms 3—3 are offset for a scissors-like action, as illustrated in the drawing, the abutments 7—7 are formed by bending the extreme end portions 8—8 of the arms toward each other so that upon movement of the arms 3—3 toward each other the abutments 7—7 will engage and prevent further movement of the arms. Prior to attachment of the fastener member to the part 5 the abutments 7—7 are spaced from each other thereby to permit a certain amount of movement of the arms toward each other to adjust the fastener to the thickness of the part 5. This distance between the abutments 7—7 is not sufficient to permit enough movement of the arms 3—3 toward each other for removal of the arms from the aperture 6 in the support by a direct axial pull. Any direct axial pull exerted upon the base of the fastener will cam the abutments into engagement, as will be clear from an inspection of Fig. 2, thereby preventing removal of the fastener.

In order that the fastener may be attached to the part 5, the arms 3—3 are adapted to move away from each other when the arms are inserted into the aperture 6 and the fastener is given a twist at the same time that pressure is applied. During the inserting action the edges 4—4 of the arms engage and bite into the wall surrounding the aperture 6 (Fig. 5) so that as the fastener is twisted the arms will move away from each other, thereby moving the abutments 7—7 out of alignment and permitting the scissors-like action of the arms as they are pressed into the aperture.

It is believed that those skilled in the art will understand that the locking feature of applicant's invention is particularly desirable and that it is adapted to fasteners for other uses. It will also be understood that the abutting surfaces may be arranged in accordance with the particular structure and arrangement of the arms 3—3.

While I have illustrated and described a preferred embodiment of my invention, I do not wish to be limited thereby, because the scope of my invention is best defined by the following claims.

I claim:

1. A one-piece snap fastener stud member having a shank comprising two spring arms formed to make snap fastening engagement with a cooperating socket and each of said arms having a locking portion adapted to engage with the locking portion on the other arm when moved directly toward each other thereby to limit movement of the arms toward each other and prevent disengagement of the shank from the socket when the arms are engaged therewith, said arms being arranged to move the locking portions out of the plane of each other for movement of the arms toward each other in a scissors-like action when the fastener is twisted and pressed into engagement with the socket.

2. A snap fastener stud member having a shank, means provided as a part of said shank for detachably engaging the fastener to a suitable socket and integral locking means formed on said shank independently of the means for engagement with a socket, said locking means being operable to permit engagement of the stud with the socket and also being operable to prevent removal of the stud from the socket by direct axial movement.

3. A snap fastener stud member having a yieldable shank, means provided as a part of said shank for detachably engaging the fastener to a socket, said shank comprising a plurality of arms adapted to move toward and away from each other and a stop portion formed on each of said arms and adapted to cooperate with each other to prevent removal of the stud from the socket by direct axial movement and being adapted to be moved out of abutting relationship to permit engagement of the stud with the socket.

4. A sheet metal fastener of the snap fastener type having a shank comprising two spring arms formed from a sheet metal blank, a base from which said arms extend at substantially a right angle, said arms having their outer edges shaped to converge and then diverge to provide means for snap fastening engagement with suitable socket means, and locking means provided on said arms and adapted to cooperate to prevent removal of the shank from the socket means by direct axial movement.

5. A sheet metal fastener of the snap fastener type having a shank comprising two spring arms formed from a sheet metal blank, a base from which said arms extend at substantially a right angle, said arms having their outer edges shaped to converge and then diverge to provide means for snap fastening engagement with suitable socket means, locking means provided on said arms and adapted to cooperate to prevent removal of the shank from the socket means by direct axial movement, and said arms being offset relative to each other to permit a scissors-like action during engagement of the shank with the socket means.

6. A sheet metal fastener of the snap fastener type having a shank comprising two spring arms formed from a sheet metal blank, a base from which said arms extend at substantially a right angle, said arms having their outer edges shaped to converge and then diverge to provide means for snap fastening engagement with suitable socket means, said arms being offset relative to each other to permit a scissors-like action during engagement of the shank with the socket means, and each of said arms having a portion of its free end bent toward the plane of the other arm thereby to provide cooperating stops adapted to abut and prevent removal of the stud from the socket means by direct axial movement.

7. A sheet metal fastener of the snap fastener type having a shank comprising two spring arms formed from a sheet metal blank, a base from which said arms extend at substantially a right angle, said arms having their outer edges shaped to converge and then diverge to provide means for snap fastening engagement with suitable socket means, said arms being offset relative to each other to permit a scissors-like action during engagement of the shank with the socket means, and each of said arms having a portion of its free end bent toward the plane of the other arm thereby to provide cooperating stops adapted to abut and prevent removal of the stud from the socket means by direct axial movement, and said arms being adapted to move away from each other to permit the bent stop portions to pass each other during attachment of the fastener to the socket means.

8. The method of locking a snap fastener stud to a supporting structure, the stud having two arms adapted to move toward and away from each other, which comprises forming abutting portions on the arms adapted to prevent removal of the fastener stud from the supporting structure by axial movement but which are adapted to be moved out of abutting engagement during attachment of the stud to the supporting structure by applying a twisting motion to the stud during the attaching operation.

9. A one-piece snap fastener stud member having a shank comprising two spring arms formed to make snap fastening engagement with a cooperating socket, each of said arms having a locking portion adapted to engage each other to limit the movement of the arms toward each other when they are engaged with a socket thereby preventing disengagement of the shank from the socket by a direct axial movement, said spring arms being in the form of relatively thin projections and each having a socket-engaging portion on one edge and a locking portion on the other edge.

10. The method of engaging a snap fastener stud, constructed according to claim 9, with a socket which comprises entering the stud into a stud-receiving aperture of the socket means and rotating the stud while pressing thereupon.

In testimony whereof, I have signed my name to this specification.

CARL L. KNUTSON.